Jan. 14, 1947.  W. R. CALWAY  2,414,358
SAND SPIKE
Filed Aug. 2, 1945
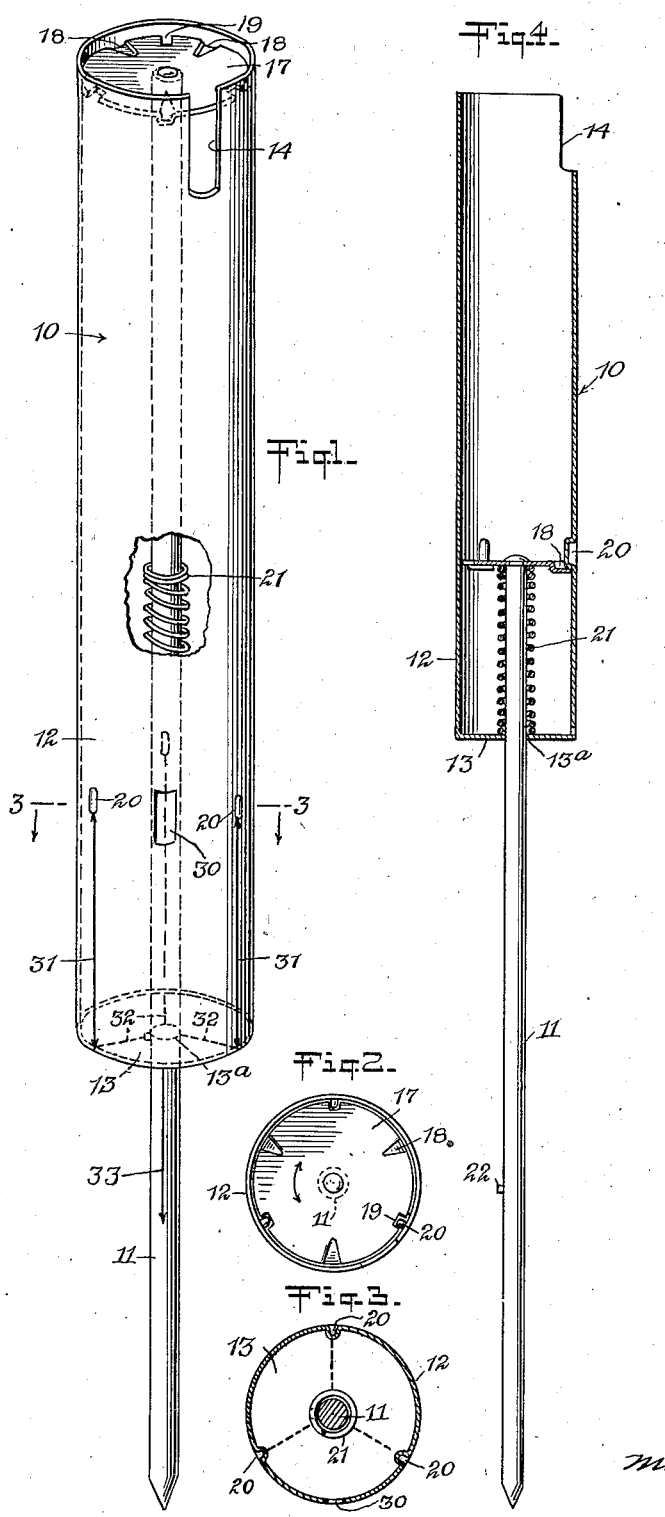
INVENTOR.
Walter R. Calway
BY
Munn, Liddy & Glaccum
Attorneys Patented Jan. 14, 1947

2,414,358

UNITED STATES PATENT OFFICE 2,414,358

SAND SPIKE

Walter R. Calway, Portland, Oreg.

Application August 2, 1945, Serial No. 608,399

4 Claims. (Cl. 248—38)

This invention relates to sand spikes for fishing rods.

The principal object of the invention is to provide a handy sand spike which may be carried around by the fisherman without any great inconvenience to him and which will be serviceable and practical to use.

A further object of the invention is the provision of a sand spike having the characteristics above referred to, which is of simple construction, simple to make, easy to use and to care for.

A preferred embodiment of this invention is shown in the accompanying drawing in which—

Fig. 1 is a perspective view of the sand spike partly broken away to show the tension member therein;

Fig. 2 is a top view thereof;

Fig. 3 is a transverse section therethrough on the line 3—3 of Fig. 1;

Fig. 4 is a vertical section through said sand spike; and

Fig. 5 is a side view thereof showing it in operative position and carrying a fishing rod.

The sand spike herein claimed comprises a socket member 10 and a spike member 11, said spike member being rotatably and slidably mounted in said socket member for angular and longitudinal movement with respect thereto. As is clear from the drawing, the socket member 10 consists of a cylindrical member 12 having a centrally apertured bottom wall 13 and an open top end. It is through the aperture 13a in said bottom wall 13 that the spike 11 extends. A vertical slot 14 is cut into the side wall of said cylinder at its top end providing, as is shown in Fig. 5, a slot for the finger rest member 15 of the fishing rod 16 carried in socket 10.

At the top end of the spike 11 is affixed a circular plate or disc 17 having alternate depressed portions 18 and notches 19 formed therein peripherally thereof. It is upon this plate that the butt of the fishing rod 16 rests when the fishing rod is carried by said socket member 10. Lugs 20 formed on the inside of said socket member 10 and constituting inwardly depressed portions in the wall thereof are positioned to engage the depressed portions 18 of the plate 17. These lugs are also positioned to register with the peripheral notches 19 of said plate. Thus it is that the spike 17 may be moved longitudinally with respect to the socket member 10 from the position therein shown in Fig. 1 to the position therein shown in Fig. 4 by simply registering the peripheral notches of the plate 17 with the lugs 20 and pulling the spike down to the position of Fig. 4.

To prevent retraction of said spike from the position shown in Fig. 4 to the position shown in Fig. 1, the spike is turned until the depressed portions 18 of the plate 17 register with and engage the lugs 20 of said socket member. To maintain said plate in engagement with said lugs, a compression spring 21 is provided, said spring being slidably mounted on said spike between the bottom wall 13 of the socket member and the plate 17 of said spike. When the spike is brought down to the position shown in Fig. 4, compression of said spring is caused between said plate 17 and said bottom wall 13. By reason thereof, a tensional force is exerted upon the plate in an upward direction maintaining it in engagement with said lugs.

To prevent the spike 11 from moving upwardly in said socket member 10 beyond the point shown in Fig. 1, that is to prevent upward and downward displacement of said spike with respect to said socket member, a lug 22 is removably affixed to the spike 11 at a predetermined point intermediate its ends. Engagement of said lug 22 with the bottom wall 13 of the socket member 10 prevents upward movement of spike 11 beyond its position as shown in Fig. 1. To remove the spike from the socket for purposes of repair or other purposes, the removable lug 22 is removed from said spike and the spike is readily removed from the socket.

To facilitate registering the depressed portions 18 and the peripheral notches 19 with the lugs 20, a window 30 is provided in the wall of the cylindrical member 12 between two of the lugs 20. It is possible looking through window 30 to ascertain the position of either the depressed portions 18 or the peripheral notches 19 and to guide them into registration with the lugs 20. Longitudinal lines 31 on the wall of the cylindrical member 12 and radial lines 32 on the bottom wall 13 of said cylindrical member are aligned with the lugs 20. A vertical line 33 is provided in the spike member 11. Registration of the depressed portions 18 and the radial notches 19 with the lugs 20 may be effected by aligning spike line 33 with the lines 31 and 32.

The device herein described is but a preferred embodiment of the invention and variations and modifications may be incorporated therein without departing from the basic principles of the invention. For example, the plate 17 is shown to be provided with three depressed portions 18 alternating with three notched portions 19. It is clear that any other number of depressed and notched portions may be used as well as any other number of lugs 20 providing that registration of said lugs with said notches and said depressed portions can be had. The device may be made of different types of material, metals and plastics being preferred types.

I claim:

1. A sand spike for fishing rods comprising a socket member adapted to receive the butt of the fishing rod and a spike member slidably mounted therein for longitudinal movement with respect thereto, the upper end of said spike being provided with a plate which carries the butt of the fishing rod, said socket member being provided with lugs positioned to engage said plate to prevent retraction of the spike into the socket member.

2. A sand spike for fishing rods comprising a socket member adapted to receive the butt of the fishing rod and a spike member slidably mounted therein for longitudinal movement with respect thereto, said spike being provided at its upper end with a plate which carries the butt of the fishing rod and being provided further with a compression spring slidably mounted thereon between said plate and the bottom of the socket member to tensionally resist outward movement of said spike from said socket member beyond a predetermined point, said socket member being provided with lugs positioned to engage said plate to prevent retraction of the spike into the socket member, engagement of said plate with said lugs being maintained by the tension of the spring.

3. A sand spike for fishing rods comprising a socket member adapted to receive the butt of the fishing rod and a spike member rotatably and slidably mounted therein for angular and longitudinal movement with respect thereto, the upper end of said spike being provided with a plate which carries the butt of the fishing rod and which has alternate depressed portions and notches formed therein, said socket member being provided with lugs positioned to engage said depressed portions to prevent retraction of the spike into the socket member when the sand spike is being used, retraction of the spike into the socket member when the sand spike is not in use being effected by turning the spike until the plate notches register with the socket member lugs and then pushing the spike into the socket member.

4. A sand spike in accordance with claim 3, a compression spring slidably mounted on the spike between the plate and the bottom of the socket member which tensionally resists outward movement of the spike from the socket member beyond a predetermined point and which tensionally maintains engaging contact of the spike plate with the socket member lugs when the lugs and the depressed portions in the plate are in registration.

WALTER R. CALWAY.